United States Patent
Thakur et al.

(10) Patent No.: US 10,025,830 B1
(45) Date of Patent: Jul. 17, 2018

(54) AGGREGATION OF DISPARATE ENTITY LISTS FOR LOCAL ENTITIES

(71) Applicant: Google LLC, Mountain View, CA (US)

(72) Inventors: Kumar Mayur Thakur, West Orange, NJ (US); Mukund Jha, Jersey City, NJ (US)

(73) Assignee: Google LLC, Mountian View, CA (US)

( * ) Notice: Subject to any disclaimer, the term of this patent is extended or adjusted under 35 U.S.C. 154(b) by 779 days.

(21) Appl. No.: 14/528,871

(22) Filed: Oct. 30, 2014

Related U.S. Application Data

(60) Provisional application No. 61/897,679, filed on Oct. 30, 2013.

(51) Int. Cl.
G06F 17/30 (2006.01)

(52) U.S. Cl.
CPC .... G06F 17/3053 (2013.01); G06F 17/30041 (2013.01)

(58) Field of Classification Search
None
See application file for complete search history.

(56) References Cited

U.S. PATENT DOCUMENTS

| | | |
|---|---|---|
| 7,870,127 B2 | 1/2011 | Gupta |
| 8,024,314 B2 | 9/2011 | Wang |
| 8,150,844 B2 | 4/2012 | Redstone |
| 8,332,396 B1 | 12/2012 | Srinivasaiah |
| 8,346,770 B2 | 1/2013 | Smith |
| 8,396,888 B2 | 3/2013 | Cheng |
| 8,484,199 B1 | 7/2013 | Katragadda |
| 8,495,046 B1 * | 7/2013 | Buchanan ............ G08G 1/0133 701/426 |
| 2002/0152267 A1 * | 10/2002 | Lennon ................. G01S 5/0018 709/203 |
| 2010/0036807 A1 | 2/2010 | Lieske |
| 2010/0076968 A1 | 3/2010 | Boyns |
| 2010/0082617 A1 | 4/2010 | Liu |
| 2011/0119265 A1 | 5/2011 | Shahabi |
| 2011/0184945 A1 | 7/2011 | Das |
| 2013/0097162 A1 | 4/2013 | Corcoran |
| 2013/0110830 A1 | 5/2013 | Vadlamani |
| 2013/0166585 A1 | 6/2013 | Das |

FOREIGN PATENT DOCUMENTS

WO WO2010075273 A1 7/2010

* cited by examiner

*Primary Examiner* — Jau-Shya Meng
(74) *Attorney, Agent, or Firm* — Fish & Richardson P.C.

(57) ABSTRACT

Methods, systems, and apparatus, including computer programs encoded on a computer storage medium, for processing local search results. In one aspect, a method includes accessing data specifying for a first local entity respective sets of second local entities; determining from the respective sets of second local entities a composite set of second local entities ranked according to a composite order of relatedness to the first local entity; determining from the composite set of second local entities, a reference distance for the first local entity; and adjusting the composite order of the composite set of second local entities based on the reference distance for the first local entity and the respective distance of each geographic location of each second local entity from the geographic location of the first local entity.

21 Claims, 3 Drawing Sheets

AGGREGATION OF DISPARATE ENTITY LISTS FOR LOCAL ENTITIES

CROSS-REFERENCE TO RELATED APPLICATIONS

This application claims the benefit of U.S. Application Ser. No. 61/897,679, filed on Oct. 30, 2013, the entire disclosure of which is incorporated herein by reference.

BACKGROUND

This specification relates to processing local entity content.

The Internet provides access to a wide variety of resources such as video or audio files, web pages for particular subjects, book articles, or news articles. A search system can identify resources in response to a search query that includes one or more search phrases (i.e., one or more words). The search system ranks the resources based on their relevance to the search query and on measures of quality of the resources and provides search results that link to the identified resources. The search results are typically ordered for viewing according to the rank.

Some search systems can obtain or infer a location of a user device from which a search query was received and include local search results that are responsive to the search query. A local search result is a search result that references a document that describes a local entity. A local entity, in turn, is an entity that has been classified as having local significance to particular location. Local entities are typically physical entities associated with an address or a region, such as a restaurant, a hospital, a landmark, and the like. A search result referencing a document describing a local entity receives a search score "boost" for a query if the location associated with the local entity is near the location of the user device. For example, in response to a search query for "coffee shop," the search system may provide local search results that reference web pages for coffee shops near the location of the user device. Many users in various geographic regions will likely be satisfied with receiving local results for coffee shops in response to the search query "coffee shop" because it is likely that a user submitting the query "coffee shop" is interested in search results for coffee shops that are local to the user's location.

Some search systems also provide search results based on similarity of the subject matter that the documents describe. In the context of local entities, for example, some search systems may use several or more different algorithms to generate lists of similar local entities. The algorithms need not necessarily take into account location. For example, entities, whether local or not, may be categorized as being similar based on one or more of the following signals: keyword descriptors; query term click fractions; search result selection co-occurrence; site analysis; and so on. Because each algorithm uses a different set of signals and implements different processing steps, each algorithm, for a particular local entity, may produce a different set of entities that are determined to be related or similar to the particular local entity. For example, a particular algorithm may be tuned to generate, for a particular restaurant entity, a list of other entities that provide the same or very similar menu items. Likewise, another algorithm may be tuned to generate, for the particular entity, a list of other entities for which users of a particular demographic exhibit similar click behavior for a set of query terms.

SUMMARY

In general, one innovative aspect of the subject matter described in this specification can be embodied in methods that include the actions of accessing data specifying for a first local entity respective sets of second local entities, each respective set being a set of second local entities ranked according to a respective order of relatedness to the first local entity, wherein each local entity is a physical entity resolved to a geographic location and having local significance to the geographic location; determining from the respective sets of second local entities, a composite set of second local entities ranked according to a composite order of relatedness to the first local entity, the composite order based on the respective orders of relatedness of the second local entities in the respective sets; determining from the composite set of second local entities, a reference distance for the first local entity, the reference distance being based on the geographic location of the first local entity, the geographic locations of the second local entities, and composite order of relatedness of the second local entities; and adjusting the composite order of the composite set of second local entities based on the reference distance for the first local entity and the respective distance of each geographic location of each second local entity from the geographic location of the first local entity.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A system implementing the subject matter described below is capable of generalizing a large class of similarity signals in a composites list to overcome biases in the underlying lists. The generalization results from an aggregation of lists, and then adjusts the resulting composite list based on a reference distance. Furthermore, the reference distance is emergent and based upon the composite list, and thus is reflective of the locality of the particular local entities.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system receives, for a particular local entity, ranked lists of related local entities. Each ranked list is a set of local entities ranked according to one or more signals of relatedness. For each list, the one or more signals used to generate the ranking are different from the one or more signals used to generate rankings for each other list.

A composite list is formed from the ranked lists, and the related local entities in the composite list are ranked according to a composite ranking derived from their respective rankings in the ranked lists. A reference distance from the particular local entity is determined from the top N local entities in the composite list. For example, the top five local entities may be selected, and the average distance from the particular local entity to the top five related local entities is used as the reference distance.

The reference distance is used to adjust the rankings in the composite list. For example, suppose the particular local entity is "John Doe's Pizza" and 123 Main Street. Other related local entities include other pizza restaurants, and other "John Doe's Pizza" restaurants. The other John Doe Pizza local entities will be highly related to the particular John Doe's Pizza at 123 Main Street, but be farther away than other related local entities because restaurants belonging to the same chain tend to be spaced apart.

The top five related local entities, and their respective distances from the particular local entity, are: John Doe's Pizza, 7.8 miles; Jane Rowe's Pizza, 0.2 miles; Richard Roe's Pizza, 0.5 miles; Pizza Shack, 0.33 miles; and Pizza Palace, 0.6 miles. Assuming a reference distance is an average distance of the top five related local entities, the reference distance is 1.89 miles. Using this reference distance, the system will demote the other John Doe's Pizza local entity, and other local entities, that are more distant than the reference distance.

The system thus provides a list of related local entities that is not subject to bias of any one particular ranking process. Furthermore, the reference distance is emergent and based upon the composite data set, and thus is reflective of the locality of the particular local entities. For example, pizza restaurants will likely have a reference distance that is smaller than the reference distance for animal shelters.

These features and additional features are described in more detail below. To illustrate certain advantages and features of the subject matter described below, the subject matter is described in the context of a search system application. However, the subject matter can be used for many other purposes, each of which that requires an analysis of entities based on similarity signals and distances.

Figure 1:
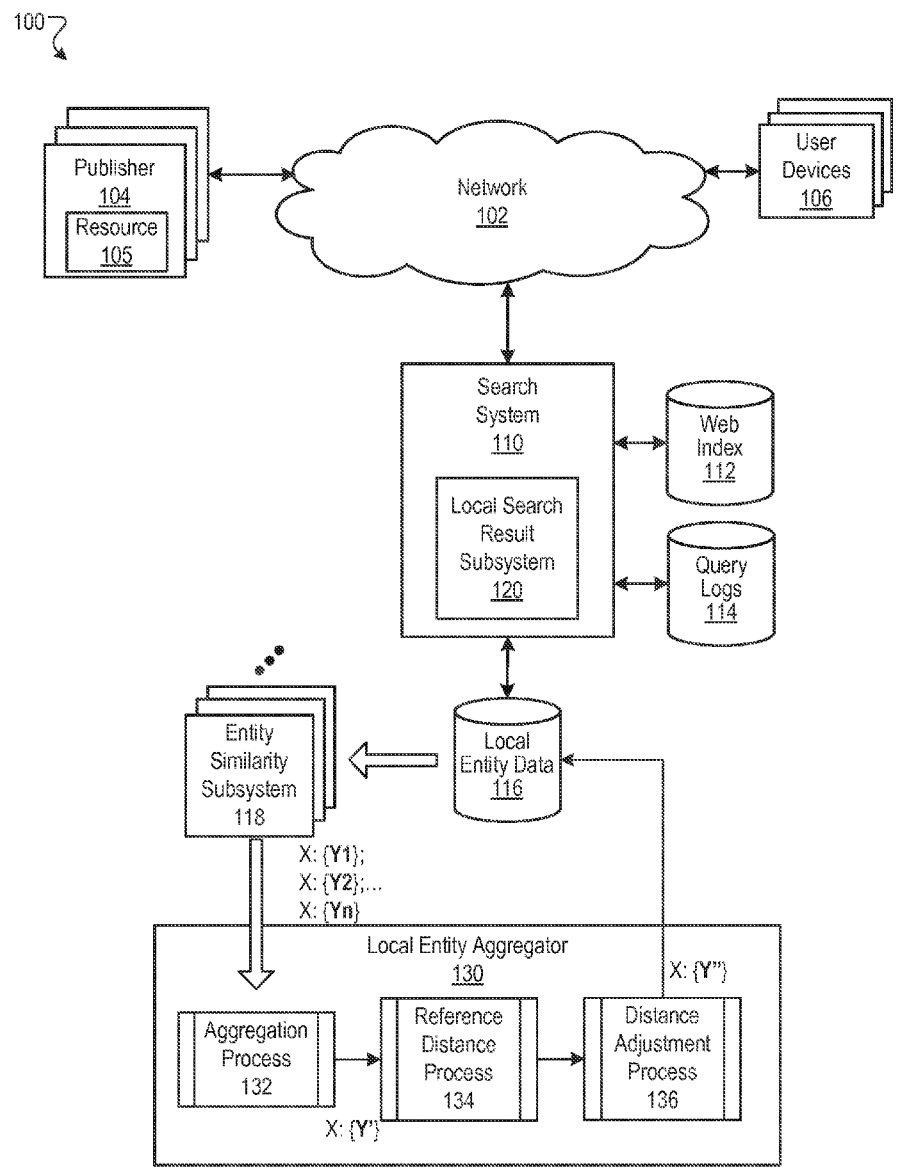
FIG. 1 is a block diagram of an example environment in which disparate entity lists are aggregated and adjusted based on an emergent reference distance.

FIG. 1 is a block diagram of an example environment 100 in which disparate entity lists are aggregated and adjusted based on an emergent reference distance. The disparate entity lists are used to generate a composite list, which is then adjusted based on a reference distance determined from the composite list. The adjusted composite list can be used, for example, to process a search query.

The example environment 100 includes a network 102, such as the Internet, and connects publisher websites 104, user devices 106, and the search system 110. Each website 104 is a collection of one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource 105 is any data that can be provided by the website 104 over the network 102 and that is associated with a resource address. Resources 105 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., scripts). Each resource can include content, such as text and video. The search system 110 may implement processes that can determine particular entities, such as persons, places and things that are the subject of each document. The search system 110 can generate a mapping of entities to documents, where the mapping specifies, for each entity, the document that describes the entity, and, optionally, a score that describes how important the entity is to the subject matter of the document. For example, a first document that list hundreds of cities having populations within a specific range (e.g., under 100,000) may have a relatively low score for each city entity, as the information the document contains for each entity is relatively little. Conversely, a second document whose primary subject is a particular city, and which describes the government make up the city, major areas of the city, and provides a history of the city, may have a much higher score for the particular city entity than the first document.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105. Data describing the resources 105 can be indexed and stored in a web index 112.

The user devices 106 submit search queries to the search system 110. In response, the search system 110 accesses the index 112 to identify resources 105 that are determined to be relevant to the search query. The search system 110 identifies the resources in the form of search results and returns the search results to the user devices 106 in search results page resource. A search result is data generated by the search system 110 that identifies a resource (generally referred to as a "document") or provides information that satisfies a particular search query. A search result for a document can include a web page title, a snippet of text extracted from the web page, and a resource locator for the resource, e.g., the URL of a web page. As used in this document, a "search result" is each individual listing provided in a search results web page, and a "search result document," or simply "document" is the resource linked to by the search result.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Other information can also be stored in the query logs, such as selection data for the queries and the web pages referenced by the search results and selected by users. The query logs 114 can thus be used to map queries submitted by user devices to resources that were identified in search results and the actions taken by users when presented with the search results in response to the queries.

Although many users may be satisfied with the search results that are generated and presented as described above, the search system 110 can use additional information and utilize additional subsystems to improve the quality of search results for particular users. One example of utilizing additional information is local search result processing. A local result subsystem 120 can identify local documents for a search query. A local document is a document that references a local entity that is specified as having local significance to a geographic location. A variety of appropriate systems may be used to determine local documents and the local entities they reference. For example, the local result subsystem 120 may determine a document is a local document if the document includes an address; or if search results for the document have a high rate of selection from user devices in a given location relative to user devices outside of the particular location; or if the local document has been specified by the publisher as being local to a particular location; etc. For queries that have a local intent, the local result subsystem 120 may indicate that certain documents that are determined to be responsive to the query are eligible for promotion. Data describing the local documents, and the local entities that are determined from the local documents, may be stored in the local entity data 116, and the feature of a document referencing a particular local entity may be stored be stored in the web index 112.

When processing local results, the similarity of local entities to other local entities may be used when determining search scores of documents that reference the local entities. Likewise, if the search system 110 is used to search local entities independent of documents (e.g., such as a search for restaurants), the similarity of local entities to other local entities can also be used when determining which local entities to list in response to a local entity query. However, as described above, there may be several subsystems that are used to determine entity similarity. In some implementations, a local entity aggregator 130 is used to process respective lists from each entity similarity subsystem 118. In particular, the local entity aggregator 130 includes an aggregation process 132, a reference distance process 134, and an aggregation process 136. The aggregation process 132 generates, for each local entity, a composite list of other entities that are determined to be similar to the local entity. The composite list is generated from the respective lists output by the entity similarity subsystems. The reference distance process 134 then determines a reference distance from the composite list, and the distance adjustment process 136 adjusts the ranking of the other entities in the composite lists based on the reference distance.

Figure 2:
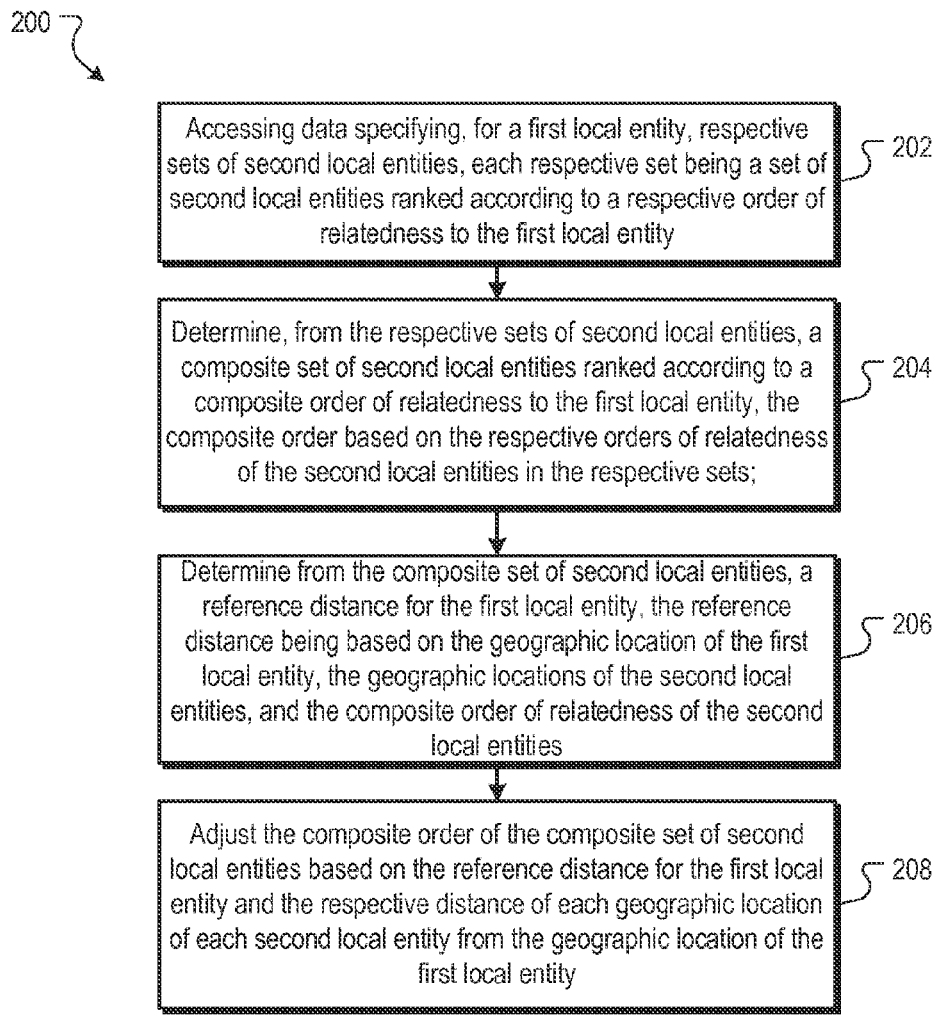
FIG. 2 is a flow diagram of an example process for generating a composite list of local entities for a particular local entity, and where the composite list is adjusted based on an emergent reference distance.

Operation of the local entity aggregator 130 is described with reference to FIG. 2, which is a flow diagram of an example process 200 for generating a composite list of local entities for a particular local entity, and where the composite list is adjusted based on an emergent reference distance. The local entity aggregator 130 can be implemented in a data processing apparatus that includes one or more computer processing devices.

The process 200 accesses data specifying, for a first local entity, respective sets of second local entities (202). Each respective set is a set of second local entities ranked according to a respective order of relatedness to the first local entity (202). Each local entity is a physical entity resolved to a geographic location and having local significance to the geographic location. For example, the local entity aggregator 130 may receive from the entity similarity subsystems 118 respective lists of entities Y that are determined to be similar to an entity X, e.g., $$X: <Y1, Y2, Y3 \ldots YN>; \quad (1)$$

$$X: <Y2, Y4, Y1 \ldots YJ>; \quad (2)$$

$$X: <Y3, Y2, Y1 \ldots YK>. \quad (M)$$

Each list (1)-(M) above may have, for the first local entity X, a list of second local entities Y ranked according to an order of relatedness to the first local entity X. The rankings for each list may differ, as each list is generated using a different algorithm and different set of signals. The signals can be, although need not be, independent of location such that each set of second local entities is ranked independent of the geographic locations of the second local entities and the first local entity. Furthermore, the cardinality of each list may be different.

The process 200 determines, from the respective sets of second local entities, a composite set of second local entities ranked according to a composite order of relatedness to the first local entity (204). The composite order is based on the respective orders of relatedness of the second local entities in the respective sets. For example, an aggregation process 132 may determine, for each second local entity, a composite relatedness score based on each respective ranking of the second local entity in each respective order in which the second local entity occurs. The composite relatedness score can, for example, take into account the relatedness score of the each second local entity in each list in which it occurs and its ordinal position, e.g., $$\text{CRS\_Y}_j = f([\text{RS}_k(Y_j), \text{OP}_k(Y_j)]) \text{ for each } k^{th} \text{ list in which the } j^{th} \text{ entity occurs.}$$

where RS and OP are the relatedness score and the ordinal position of the $j^{th}$ entity in the $k^{th}$ list, and CRS_Y; is the composite relatedness score for the $j^{th}$ entity. After the composite scores are generated, the composite set of second local entities is ranked according to a composite order of relatedness based on the composite scores.

A variety of appropriate aggregation algorithms can be used to generate the composite relatedness scores. Furthermore, other factors can also be used to determine the composite relatedness score or a second local entity. For example, the number of lists in which the local entity occurs, or is within the top N ranked local entities, may be taken into account.

The output of the aggregation process is the composite list of local entities of the form:

$$X: <Y'> = <Y2, Y1, Y3, Y4 \ldots Yq>$$

The process 200 determines, from the composite set of second local entities, a reference distance for the first local entity (206). The reference distance is based on the geographic location of the first local entity, the geographic locations of the second local entities, and the composite order of relatedness of the second local entities. The reference distance is emergent and based on the ranking of the second local entities in the composite list. The reference distance can be calculated based, in part, on the constituent distances of each second local entity in the composite set to the first local entity. The reference distance can also be calculated, based, in part, on the ordinal position of each second local entity, where distances of local entities at ordinal positions that are indicative of being very similar to the first entity (e.g., "high ordinal positions" of 1, 2, 3, etc.) are weighed more heavily than distances of local entities at ordinal positions that are indicative of being less similar to the first entity (e.g., "low ordinal positions" of 20, 21, 22, etc.). In these implementations, a weighted central tendency can be calculated, such as a weighted mean or weighted median.

Figure 3:
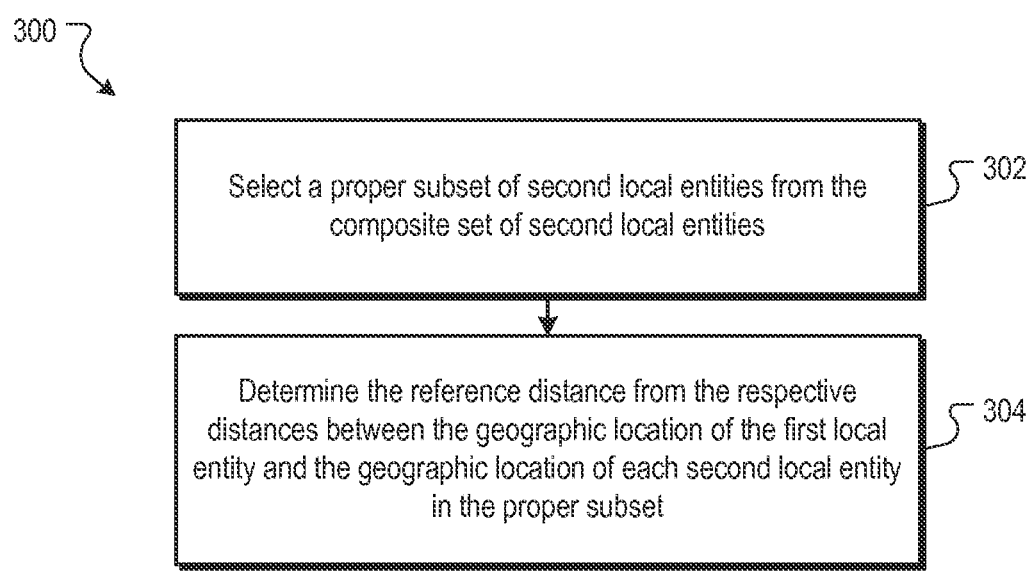
FIG. 3 is a flow diagram of an example process for determining a reference distance from a composite list of local entities.

Another example process for determining a reference distance is described with reference to FIG. 3, which is a flow diagram of an example process 300 for determining a reference distance from a composite list of local entities.

The process 300 selects a proper subset of second local entities from the composite set of second local entities (302). For example, the proper subset of second local entities selected from the composite set of second local entities may be the top N second local entities at corresponding N ordinal positions indicative of respectively highest degrees of relatedness to the first local entity. The value of N can vary, and may be 5, 10, 20, or more.

The process 300 determines the reference distance from the respective distances between the geographic location of the first local entity and the geographic location of each second local entity in the proper subset (304). For example, for the restaurant example described above, the respective distances from the particular local entity, are: John Doe's Pizza, 7.8 miles; Jane Rowe's Pizza, 0.2 miles; Richard Roe's Pizza, 0.5 miles; Pizza Shack, 0.33 miles; and Pizza Palace, 0.6 miles. If a reference distance process 134 determines a reference distance as an average distance of the top five related local entities, the reference distance is 1.89 miles. However, if a median is used, the reference distance is 0.5 miles. By way of another example, if a weighting scheme is used in which the distances are more heavily weighted in proportion to the ordinal position of the second local entity, and an average is determined, then the reference distance may be slightly more than 1.89 miles.

The reference distance can also be determined in other ways. For example, one of a maximum or minimum distance based on the N entities can be used as reference distance, etc.

Conversely, another weighting scheme may discount the distance of the first several top rated local entities, as these local entities may correspond to other locations of a same store or business. The discounting can, for, be an application of a percentage of the distances, or be some other appropriate discounting scheme.

In still another implementation, the proper subset of local entities may not include a top rated local entity so as to reduce the likelihood such bias that occurs when distant locations of the same business are processed. For example, the subset may be the local entities ranked at positions 2-6, and excludes the first top-ranked (or sever of the top ranked) local entities.

The process 300 adjusts the composite order of the composite set of second local entities (308). The composite order is based on the reference distance for the first local entity and the respective distance of each geographic location of each second local entity from the geographic location of the first local entity. A distance adjustment process 136 can be used to adjust the scores, and a variety of appropriate adjustments can be used. For example, each composite relatedness score can be adjusted based on a function of the form:

$$\text{Adj\_CRS\_}Y_j = \text{CRS\_}Y_j * f(Dx_j, RD_x)$$

where $Dx_j$ is the distance of the $j^{th}$ local entity $Y_j$ from the first local entity X, RDx is the reference distance determined from the composite set, and $\text{Adj\_CRS\_}Y_j$ is the adjusted composite relatedness score for the $j^{th}$ entity. The function f(*) can, for example, be based on a ratio of Dx to RDx, e.g., Dx/RDx, or based on some other relation between Dx and RDx. The function f(*) can, for example, be a stepped decay in which composite relatedness scores of local entities Y having a distance Dx less the distance RDx are not affected, and composite relatedness scores of local entities Y having a distance Dx greater than the distance RDx decay asymptotically. In other implementations, the function f(*) can boost scores relatedness scores of local entities Y having a distance Dx less the distance RDx. Still other scoring adjustment functions can also be used.

The output of the distance adjustment process is the composite list in which the composite relatedness scores are adjusted such that the composite order of the second local entities is adjusted from the original order of the composite list, e.g., $$X: <Y''> = <Y1, Y4, Y3, Y11 \ldots Yk>$$

Data describing the adjusted list is then stored in the local entity data 116. The local entity data 116 thus stores, for each processed local entity X, a ranked list of related local entities Y that takes into account, when ranking each list, the emergent reference distance for that list. The data can be used by a variety of different systems, such as the search system 110, when processing of local entities based on similarities and distances is required.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
accessing, by a processor, data that specifies, for a first local entity, respective sets of second local entities that have been identified as being related to the first local entity,
wherein the respective sets of second local entities include sets having multiple second local entities,
wherein the second local entities in each respective set of second local entities are ranked according to a respective order of relatedness to the first local entity, and the respective orders of relatedness to the first local entity of at least some of the respective sets of second local entities are different from each other, and
wherein each local entity is a physical entity that has been resolved to a respective geographic location;
determining, by the processor, a composite set of second local entities, including selecting second local entities for inclusion in the composite set of second local entities from the respective sets of second local entities, wherein the second local entities of the composite set are ranked according to a composite order of relatedness to the first local entity, the composite order of relatedness to the first local entity determined based on the respective orders of relatedness to the first local entity of the respective sets of second local entities;
determining, by the processor, from the composite set of second local entities, a reference distance for the first local entity, the reference distance being based on the respective geographic location of the first local entity and the respective geographic locations of at least a subset of the composite set of second local entities;
adjusting, by the processor, the composite order of the composite set of second local entities based on the reference distance for the first local entity and the respective distances of the respective geographic locations of second local entities from the respective geographic location of the first local entity, wherein the adjusting includes demoting a particular one of the second local entities in the composite order of the composite set of second local entities as a result of the respective distance of the respective geographic location of the particular one of the second local entities from the respective geographic location of the first local entity being greater than the reference distance for the first local entity; and
presenting the composite set of second local entities according to the adjusted composite order.

2. The method of claim 1, wherein determining the composite set of second local entities ranked according to the composite order of relatedness to the first local entity comprises:
determining, by the processor, for each second local entity, a composite relatedness score based on each respective ranking of the second local entity in each respective order in which the second local entity occurs; and
determining, by the processor, the composite order based on the composite relatedness scores of the second local entities.

3. The method of claim 2, wherein each set of second local entities ranked according to the respective order of relatedness to the first local entity are ranked independent of the geographic locations of the second local entities and the first local entity.

4. The method of claim 2, wherein adjusting, by the processor, the composite order of the composite set of second local entities based on the reference distance for the first local entity and the respective distance of each geographic location of each second local entity from the geographic location of the first local entity comprises:
for each second local entity in the composite set, adjusting, by the processor, its composite relatedness score based the respective distance of the geographic location of the second local entity from the geographic location of the first local entity and the reference distance.

5. The method of claim 4, wherein adjusting, by the processor, the composite relatedness score based the respective distance of the geographic location of the second local entity from the geographic location of the first local entity and the reference distance comprises increasing, by the processor, the composite relatedness score in proportion to the magnitude of the reference distance relative to the respective distance.

6. The method of claim 5, wherein determining, by the processor, the reference distance comprises determining, by the processor, a central tendency from the respective distances between the geographic location of the first local entity and the geographic location of each second local entity in the proper subset.

7. The method of claim 1, where determining the reference distance for the first local entity comprises:
selecting, by the processor, a proper subset of second local entities from the composite set of second local entities; and
determining, by the processor, the reference distance from the respective distances between the geographic location of the first local entity and the geographic location of each second local entity in the proper subset.

8. The method of claim 7, wherein selecting, by the processor, the proper subset of second local entities from the composite set of second local entities comprises selecting, by the processor, the up to N second local entities at corresponding N ordinal positions indicative of respectively highest degrees of relatedness to the first local entity relative to the second local entities at other ordinal positions in the composite order of relatedness.

9. A system, comprising:
a data processing apparatus; and
a data store storing instructions executable by the data processing apparatus and that upon such execution cause the data processing apparatus to perform operations comprising:

accessing data that specifies, for a first local entity, respective sets of second local entities that have been identified as being related to the first local entity,
 wherein the respective sets of second local entities include sets having multiple second local entities,
 wherein the second local entities in each respective set of second local entities are ranked according to a respective order of relatedness to the first local entity, and the respective orders of relatedness to the first local entity of at least some of the respective sets of second local entities are different from each other, and
 wherein each local entity is a physical entity that has been resolved to a respective geographic location;
determining a composite set of second local entities, including selecting second local entities for inclusion in the composite set of second local entities from the respective sets of second local entities,
 wherein the second local entities of the composite set are ranked according to a composite order of relatedness to the first local entity, the composite order of relatedness to the first local entity determined based on the respective orders of relatedness to the first local entity of the respective sets of second local entities;
determining from the composite set of second local entities, a reference distance for the first local entity, the reference distance being based on the respective geographic location of the first local entity and the respective geographic locations of at least a subset of the composite set of second local entities;
adjusting the composite order of the composite set of second local entities based on the reference distance for the first local entity and the respective distances of the respective geographic locations of second local entities from the respective geographic location of the first local entity, wherein the adjusting includes demoting a particular one of the second local entities in the composite order of the composite set of second local entities as a result of the respective distance of the respective geographic location of the particular one of the second local entities from the respective geographic location of the first local entity being greater than the reference distance for the first local entity; and
presenting the composite set of second local entities according to the adjusted composite order.

10. The system of claim 9, wherein determining the composite set of second local entities ranked according to the composite order of relatedness to the first local entity comprises:
 determining, for each second local entity, a composite relatedness score based on each respective ranking of the second local entity in each respective order in which the second local entity occurs; and
 determining the composite order based on the composite relatedness scores of the second local entities.

11. The system of claim 10, wherein each set of second local entities ranked according to the respective order of relatedness to the first local entity are ranked independent of the geographic locations of the second local entities and the first local entity.

12. The system of claim 10, wherein adjusting the composite order of the composite set of second local entities based on the reference distance for the first local entity and the respective distance of each geographic location of each second local entity from the geographic location of the first local entity comprises:
 for each second local entity in the composite set, adjusting its composite relatedness score based the respective distance of the geographic location of the second local entity from the geographic location of the first local entity and the reference distance.

13. The system of claim 12, wherein adjusting the composite relatedness score based the respective distance of the geographic location of the second local entity from the geographic location of the first local entity and the reference distance comprises increasing the composite relatedness score in proportion to the magnitude of the reference distance relative to the respective distance.

14. The system of claim 9, where determining the reference distance for the first local entity comprises:
 selecting a proper subset of second local entities from the composite set of second local entities; and
 determining the reference distance from the respective distances between the geographic location of the first local entity and the geographic location of each second local entity in the proper subset.

15. The system of claim 14, wherein determining the reference distance comprises determining a central tendency from the respective distances between the geographic location of the first local entity and the geographic location of each second local entity in the proper subset.

16. The system of claim 14, wherein selecting the proper subset of second local entities from the composite set of second local entities comprises selecting the up to N second local entities at corresponding N ordinal positions indicative of respectively highest degrees of relatedness to the first local entity relative to the second local entities at other ordinal positions in the composite order of relatedness.

17. A non-transitory computer storage medium storing instructions executable by a data processing apparatus and that upon such execution cause the data processing apparatus to perform operations comprising:
 accessing data that specifies, for a first local entity, respective sets of second local entities that have been identified as being related to the first local entity,
 wherein the respective sets of second local entities include sets having multiple second local entities,
 wherein the second local entities in each respective set of second local entities are ranked according to a respective order of relatedness to the first local entity, and the respective orders of relatedness to the first local entity of at least some of the respective sets of second local entities are different from each other, and
 wherein each local entity is a physical entity that has been resolved to a respective geographic location;
 determining a composite set of second local entities, including selecting second local entities for inclusion in the composite set of second local entities from the respective sets of second local entities,
 wherein the second local entities of the composite set are ranked according to a composite order of relatedness to the first local entity, the composite order of relatedness to the first local entity determined based on the respective orders of relatedness to the first local entity of the respective sets of second local entities;
 determining from the composite set of second local entities, a reference distance for the first local entity, the reference distance being based on the respective geographic location of the first local entity and the respective geographic locations of at least a subset of the composite set of second local entities;

adjusting the composite order of the composite set of second local entities based on the reference distance for the first local entity and the respective distances of the respective geographic locations of second local entities from the respective geographic location of the first local entity, wherein the adjusting includes demoting a particular one of the second local entities in the composite order of the composite set of second local entities as a result of the respective distance of the respective geographic location of the particular one of the second local entities from the respective geographic location of the first local entity being greater than the reference distance for the first local entity; and presenting the composite set of second local entities according to the adjusted composite order.

18. The non-transitory computer storage medium of claim 17, wherein determining the composite set of second local entities ranked according to the composite order of relatedness to the first local entity comprises:

determining, for each second local entity, a composite relatedness score based on each respective ranking of the second local entity in each respective order in which the second local entity occurs; and determining the composite order based on the composite relatedness scores of the second local entities.

19. The non-transitory computer storage medium of claim 17, wherein determining the reference distance for the first local entity comprises:

selecting a proper subset of second local entities from the composite set of second local entities; and determining the reference distance from the respective distances between the geographic location of the first local entity and the geographic location of each second local entity in the proper subset.

20. The non-transitory computer storage medium of claim 19, wherein determining the reference distance comprises determining a central tendency from the respective distances between the geographic location of the first local entity and the geographic location of each second local entity in the proper subset.

21. The non-transitory computer storage medium of claim 19, wherein selecting the proper subset of second local entities from the composite set of second local entities comprises selecting the up to N second local entities at corresponding N ordinal positions indicative of respectively highest degrees of relatedness to the first local entity relative to the second local entities at other ordinal positions in the composite order of relatedness.

* * * * *

UNITED STATES PATENT AND TRADEMARK OFFICE
CERTIFICATE OF CORRECTION

PATENT NO.        : 10,025,830 B1
APPLICATION NO.   : 14/528871
DATED             : July 17, 2018
INVENTOR(S)       : Thakur et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this
Twenty-sixth Day of February, 2019

Andrei Iancu
*Director of the United States Patent and Trademark Office*